June 5, 1962  R. HUMPHREY  3,037,656
PRESSURE VESSELS

Filed June 6, 1960  2 Sheets-Sheet 1

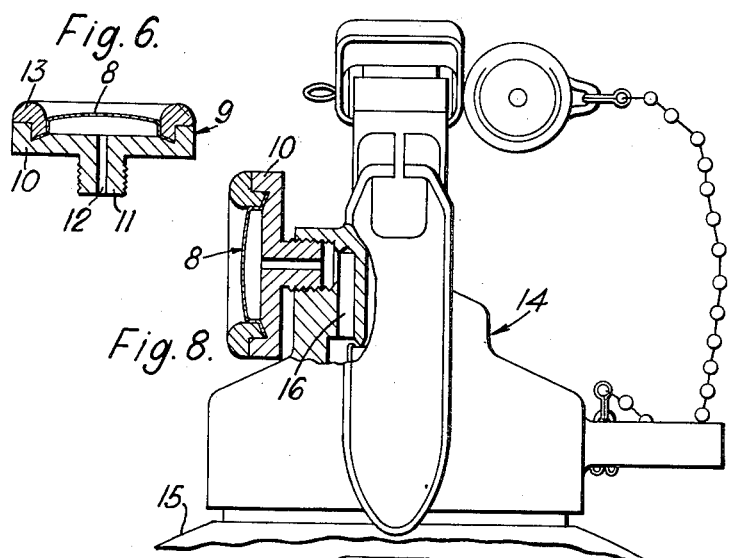
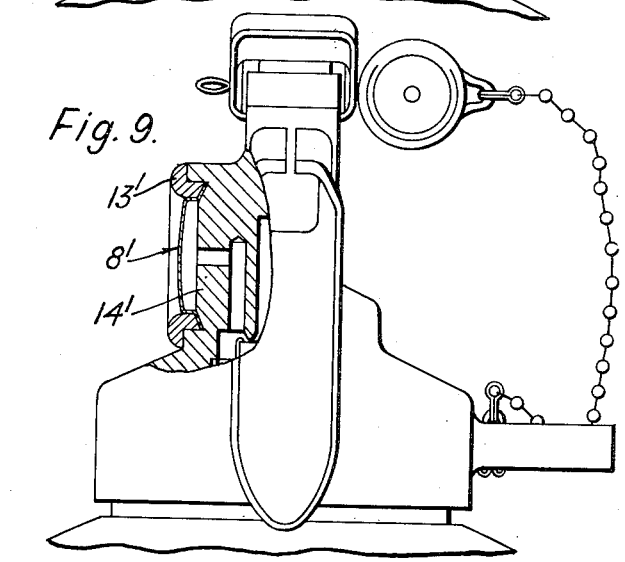

ved June 5, 1962

3,037,656
PRESSURE VESSELS
Robert Humphrey, Wembley, England, assignor to The Pyrene Company Limited
Filed June 6, 1960, Ser. No. 34,065
2 Claims. (Cl. 220—1)

This invention relates broadly to vessels maintained under internal pressure and is particularly applicable to such vessels charged with fire-extinguishing media.

There has long been a need for a cheap simple device for attachment to such vessels to indicate whether the correct pressure exists inside them.

It is desirable that the device should be capable of showing both to the eye and to the touch whether the pressure has fallen, is correct or has exceeded a safe value. This last desideratum is peculiar to vessels maintained under pressure, and arises from the fact that a vessel which has been subjected to excess pressure may be weakened so as to be dangerous or useless.

According to this invention part of the surface of the vessel exposed to the internal pressure is constituted by a pressure indicator in the form of a dished circular disc with a flange which includes a substantially cylindrical part adjacent the edge of the disc, the disc being of elastic material capable of being deformed with reversal of curvature by pressure applied to the convex face and the disc with at least part of the flange being capable of becoming dome-shaped as a whole under a pressure greater than that which should be maintained in the vessel. The disc is exposed to the internal pressure and is normally deformed outwards by it, so use can be made of its ability to be deformed inwards, and to return under the internal pressure if it is so deformed, to provide a visual or tactile indication of the internal pressure. If the pressure in the vessel becomes excessive the disc and all or part of the flange become outwardly domed.

The invention is particularly applicable to pressurized fire extinguishers, which commonly have a cylindrical shell and domed ends, and the pressure-indicating device may be mounted in such an end. The pressure indicator may also be mounted on the operating head of a fire extinguisher provided that there is communication between the inner surface of the disc and the interior of the extinguisher.

Preferably the indicator is a single piece of spring steel. This moves from convexity to concavity and vice versa with snap action. This is advantageous since the extent of the dishing, and therefore of the movement of the centre of the disc, may be so small that it is difficult to see or even to feel whether the disc is concave or convex outwards, in the absence of the sudden movement due to the snap action.

Some fire extinguishers with indicators according to the invention will now be described with reference to the accompanying drawings, in which:

FIGURE 6 is a section through a second indicator mounted in a holder;

FIGURE 7 is an enlarged section through the indicator shown in FIGURE 6;

FIGURE 8 shows this second indicator mounted in the head of a fire extinguisher;

FIGURE 9 is a section through the head of another fire extinguisher; and

Figure 1:
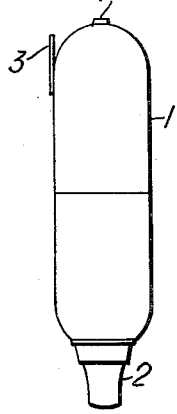
FIGURE 1 is an elevation of a fire extinguisher equipped with one indicator.

FIGURE 1 shows a fire extinguisher comprising a cylindrical vessel 1 domed at both ends, with a discharge head 2 at one end and an attachment 3 by which it may be hung in a bracket. This vessel is charged with a dry extinguishing powder and nitrogen, the function of the nitrogen being to maintain the powder charge under pressure so that it can be forcibly expelled through the head 2 by breaking a seal in the head on the outbreak of fire. It is important to know whether the internal pressure is maintained, and according to the invention a pressure indicator 4 is provided in the second domed end.

Figure 2:
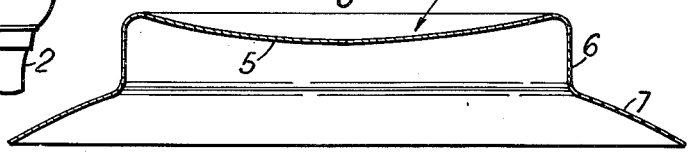
FIGURE 2 is a section through the pressure indicator.

The indicator 4 is a single piece of spring steel. As shown in FIGURE 2 it comprises a disc 5 with a flange composed of a shallow cylindrical wall 6 and an outer flange part 7 which merge into one another by small radii. The flange part 7 is curved to suit the contour of the vessel wall and is soldered to the inner surface of the vessel to form a pressure-tight joint.

One advantage presented by this indicator is that the wall 6 projects through the opening in the vessel when the indicator is fitted, and so locates the indicator in position when the part 7 is joined to the inner surface of the vessel.

Figure 3:
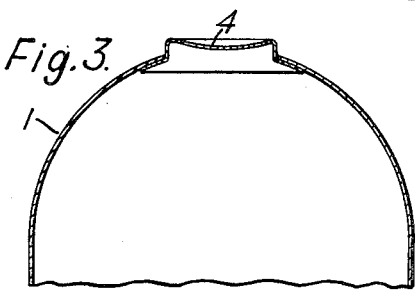
FIGURES 3, 4 and 5 are sections through the end of the extinguisher showing the pressure indicator under different pressure conditions.
Figure 4:
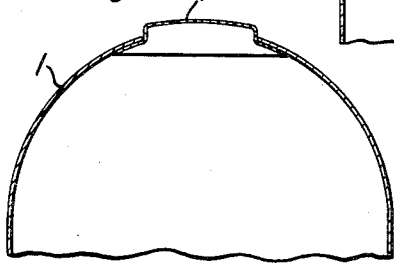

The central disc 5 is dished and can be moved resiliently between convex and concave positions. It is made of such strength that it can be pushed inwards and will remain with a concave face to the outside when there is no internal pressure, as shown in FIGURE 3, but will move outwards again under greater pressure, as shown in FIGURE 4. This is the normal position. When the vessel is charged and under adequate pressure, the disc cannot be depressed by normal digital pressure; for pressures lower than normal the disc can be pushed in, but on release will be returned (by the internal pressure) to its normal outward position.

Figure 5:
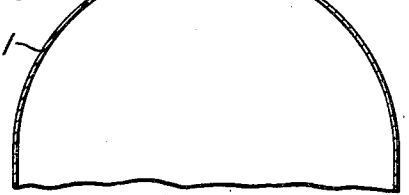

It may happen that the vessel is over-pressurised during the charging or that for any reason excess pressure may develop. The indicator used according to the invention shows such excess pressure. The indicator is deformed to the dome shape shown in FIGURE 5 under high internal pressure. This shape is irreversible because of permanent stretching of the metal, so if excess pressure is developed the indicator gives a permanent warning of this. This is a valuable feature because a vessel which has once been exposed to excess pressure should be discarded.

When domed the disc 5 is of the ideal shape to withstand high pressure, and therefore will not rupture before the thicker material of the vessel itself.

As an example, an extinguisher as shown in FIGURE 1 had a vessel of mild steel nominally 0.03" thick. The indicator 4 was of 0.006" gauge austenitic stainless steel and was of 1¼" overall diameter, the disc 5 itself being ⅞" in diameter. The extinguisher was tested by being filled with water under pressure. It was found that the disc was concave to the exterior when the internal pressure was zero. It had a convex face to the exterior and could not be reversed by manual pressure at 50 lbs./sq. in. internal pressure. It became dome-shaped at 750 lbs./sq. in. and a longitudinal tear appeared in the extinguisher at 1250 lbs./sq. in. while the indicator remained dome-shaped but unruptured.

FIGURES 6 and 7 show an indicator 8, essentially similar to the indicator 4 but of slightly different shape, mounted in a holder 9 composed of a cup-shaped part 10 with a spigot 11 having a bore 12; and a retaining ring 13 which holds the indicator 8 in the cup-shaped part 16. The ring 13 is soldered to the part 10.

This indicator may be mounted in the head 14 of the extinguisher 15 shown in FIGURE 8, and communication between the interior of the vessel and the indicator is established through a passage 16 in the head.

FIGURE 9 shows a modification in which part of the head 14' of an extinguisher as shown in FIGURE 6 is recessed to receive an indicator 8' and a retaining ring 13'.

Figure 10:
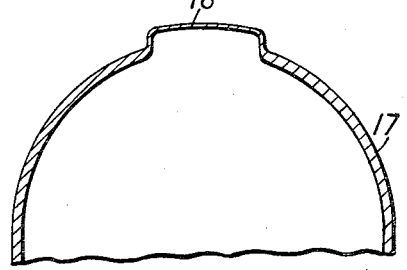
FIGURE 10 is a section through part of yet another fire extinguisher.

FIGURE 10 shows part of a vessel moulded from a plastic with the indicator integral with the remainder of the vessel. The wall of the vessel is shown at 17 and the indicator at 18. The disc 18 is shown in the position when the pressure in the vessel is normal. An integral indicator such as that shown at 18 can also be formed in a metal vessel.

The extent to which the indicator can become dome-shaped can be increased by forming circumferential corrugations in it.

I claim:

1. A vessel to be maintained under an internal pressure of a predetermined value, a pressure indicator in the wall of said vessel, said pressure indicator comprising a relatively small area of the total wall area of said vessel, said pressure indicator including a disc having a peripheral flange thereon, said flange extending substantially normally with respect to the disc, the edge portion of the peripheral flange being connected with the wall of said vessel, said disc and flange being of a thickness substantially less than the thickness of the wall of the vessel, said disc being of an elastic material capable of being moved with snap action from a convex to an overcenter concave position upon application of external pressure thereto to indicate a pressure condition in said vessel less than said predetermined value, said disc being of an area sufficient to maintain said disc in a convex position upon application of normal digital pressure when the pressure condition within said vessel is substantially at said predetermined value, said disc and said flange together being permanently deformed to a substantially dome convex shape to indicate a pressure condition in said vessel substantially in excess of said predetermined value and in said permanently deformed shape having a strength at least equal to the strength of the wall of said vessel.

2. A vessel according to claim 1 wherein said pressure indicator comprises a single piece of spring steel.

References Cited in the file of this patent

UNITED STATES PATENTS

| | | |
|---|---|---|
| 1,570,732 | Emerson | Jan. 26, 1926 |
| 1,577,974 | Kelly | Mar. 23, 1926 |
| 2,027,430 | Hansen | Jan. 14, 1936 |
| 2,330,940 | Wright | Oct. 5, 1943 |